Dec. 8, 1964  H. E. CLARK  3,160,746
CORONA CHARGING APPARATUS FOR NON-UNIFORMLY CHARGING
A XEROGRAPHIC PLATE IN A PREDETERMINED MANNER
Filed May 1, 1961  3 Sheets-Sheet 1

INVENTOR.
HAROLD E. CLARK
BY Stanley Z. Cole
ATTORNEY

Dec. 8, 1964 H. E. CLARK 3,160,746
CORONA CHARGING APPARATUS FOR NON-UNIFORMLY CHARGING
A XEROGRAPHIC PLATE IN A PREDETERMINED MANNER
Filed May 1, 1961 3 Sheets-Sheet 2
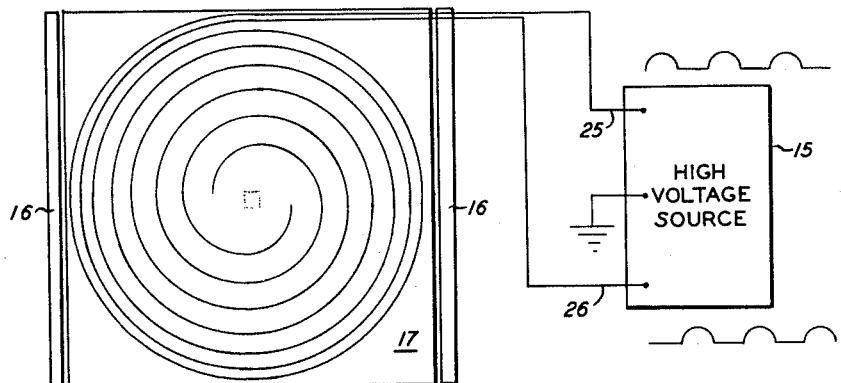
FIG. 10
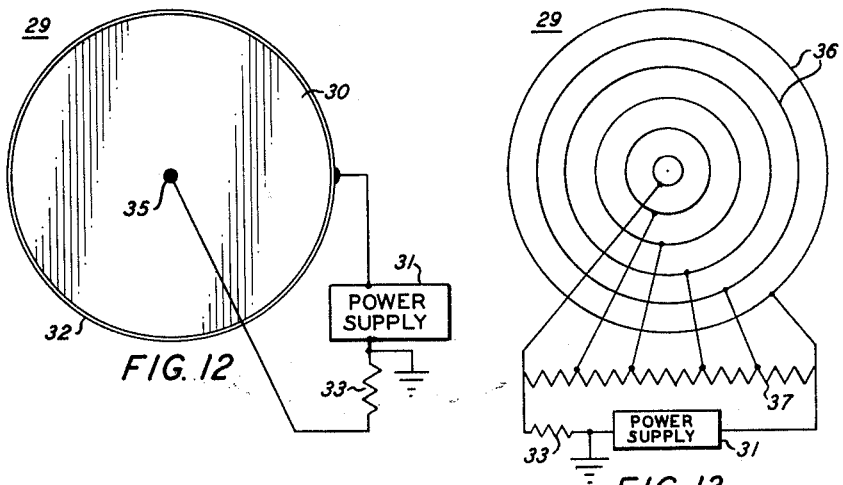
FIG. 12
FIG. 13
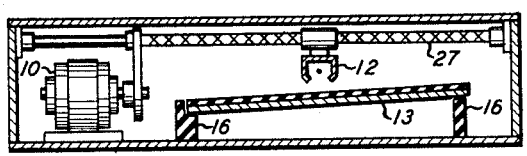
FIG. 11
FIG. 14
INVENTOR.
HAROLD E. CLARK
BY
ATTORNEY

INVENTOR.
HAROLD E. CLARK

United States Patent Office 3,160,746
Patented Dec. 8, 1964

3,160,746
CORONA CHARGING APPARATUS FOR NON-UNIFORMLY CHARGING A XEROGRAPHIC PLATE IN A PREDETERMINED MANNER
Harold E. Clark, Penfield, N.Y., assignor to Xerox Corporation, a corporation of New York
Filed May 1, 1961, Ser. No. 106,657
13 Claims. (Cl. 250—49.5)

This invention relates to xerography and, in particular, to compensation for a non-uniform exposure of xerographic plates.

In the field of image reproductions by illumination, extensive variation in exposure results in loss of image difinition. A particular area in which this problem stands out is in the reproduction of displays from plan position indicators (PPI) in connection with radar systems. In a PPI display, there is a peak of illumination intensity near the center of the display with a gradual loss of intensity toward the edges. Likewise all targets, objects or other details in the display appear brighter toward the center and fainter toward the edges of the display. In photographic reproduction of such a predictably non-uniform display, several conventional techniques can be used. For instance, a graded density mask can be interposed graded radially from maximum density to zero density at the edges. Also the cathode ray spot brightness of the PPI scope can be decreased at the center and increased to its maximum at its edges.

In accordance with the present invention, there is devised novel methods, means and apparatus unique to xerography for improving reproduction of charateristically non-uniform displays.

In the art of xerography as disclosed in Carlson U.S. 2,297,691, an image is recorded by processing a special plate comprising a surface layer of photoconductive insulating material on a conductive backing. In the process, the plate receives an eletrostatic charge and is then exposed to selective illumination in accordance with the image pattern to be recorded. Illumination reduces the charge in the exposed areas. After exposure, printing material in the form of pigmented electroscopic particles is deposited on the plate to which it is attracted in accordance with the remanent charge pattern.

In electrostatically charging a photoconductive insulating plate, various irregularities have been noted, in the performance of the plate, related to the charge level obtained. However little attention has been paid to this since development of an electrostatic latent image depends on potential differences between image and non-image areas and not on the potential difference between the latent image and the potential reference for the apparatus. In the past the approach has been to charge to a level that will allow good image development in the usual situation.

In attempting to solve the problem of compensating for predictable non-uniformities, the above mentioned irregularities were examined more closely. Examination showed that there was actually greater plate sensitivity when a higher level electrostatic charge was used. That is, a photoconductive insulating surface charged to a higher potential required less exposure to provide a given potential difference between image and non-image areas. Thus, in accordance with the present invention, this sensitivity variation with charge amplitude has been found useful in compensating for charactertistic non-uniform illumination from an object to be recorded. Thus an object of the invention is to define methods, means and apparatus for compensation of non-unifoirm exposure in xerography.

An additional object of the invention is a method for non-uniform charging of a xerographic plate.

It is an additional object to define charging apparatus capable of non-uniform charging of a xerographic plate.

It is an additional object to define development apparatus for continuous tone development of a non-uniformly charged xerographic plate.

It is a still further object to define apparatus for reproducing images from a plan position indicator.

Further objects and features of the invention will become apparent while reading the following descriptions in connection with the drawings wherein:

FIG. 10 is a sixth embodiment of a corona discharge device for charging a circular area;

FIG. 11 is a side elevation of a charging apparatus for non-uniform charging of a rectangular xerographic plate;

FIG. 12 is a first embodiment of a continuous tone-development electrode for developing non-uniformly charged xerographic plates;

FIG. 13 is a second embodiment of a continuous tone-development electrode for developing non-uniformly charged xerographic plates;

FIG. 14 is a cross-sectional view of simple developing mechanism according to this invention;

A representative simplified charging apparatus, in accordance with the concepts of the present invention, is shown in FIGS. 1–4. The function of this apparatus is to deposit electrostatic charge non-uniformly over a circular area of a member to be charged. In particular, the apparatus of FIGS. 1–4 will deposit an electrostatic charge varying in accordance with a linear taper. Thus, a low charge is produced in the center and a gradually increasing charge is produced toward the circumference with a relatively high charge at the circumference of the charged area.

Figure 1:
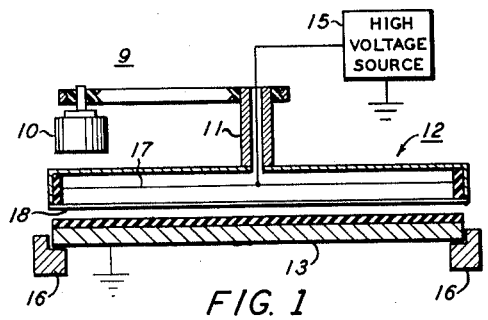
FIG. 1 is a cross section of a simple electrostatic charging apparatus in accordance with the invention.

Referring to FIG. 1, a drive means 10 such as a motor, acting through a belt-pulley combination 9, rotates corona discharge device 12 on support axle 11 over xerographic plate 13. Corona discharge device 12 is energized for discharge by high voltage source 15, while positioned above xerographic plate 13 which in turn is positioned and disposed on support members 16. As may be observed in FIG. 2, rotation of corona discharge device 12, by support axle 11, causes corona discharge device 12 to sweep over a circular area of xerographic plate 13 with a diameter equal to the length of the discharge device.

Figure 3:
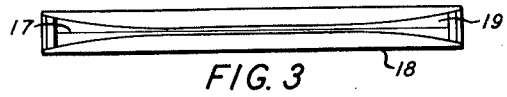
FIG. 3 is a bottom view of one embodiment of a corona discharge device for charging a circular area on a xerographic plate.
Figure 4:
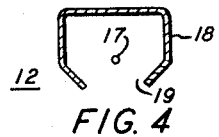
FIG. 4 is a first alternative cross-sectional view of the charging device illustrated in FIGS. 1 to 7.

One embodiment of the corona discharge device is illustrated in FIGS. 3 and 4. Further alternative embodiments of the corona discharge device will be described below. FIGS. 3 and 4 show bottom and cross-sectional views, respectively, of a corona discharge device known in the art as a corotron. Such a device is described in Vyverberg U.S. 2,836,725. Conventionally, a corotron comprises a slender conductor or element 17 supported inside a conductive shield or grid 18. The shield or grid 18 surrounds and incloses element 17, leaving open a narrow axial slit 19 along the side which will be positioned adjacent to a surface to be charged. In accordance with the present invention, the axial slit is tapered in a curvilinear fashion so that it is relatively narrow at the center and relatively wide at the ends. The shield 18 serves to control and limit the charge current produced by the corotron.

Figure 2:
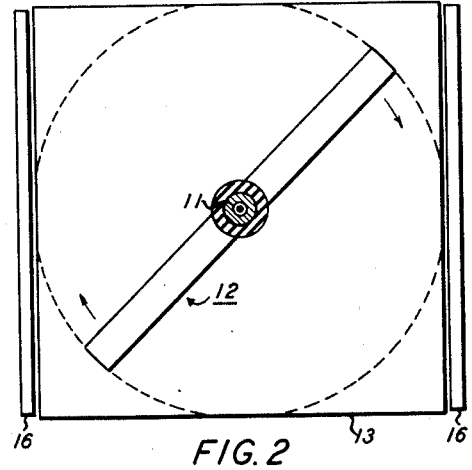
FIG. 2 is a top view of the charging apparatus of FIG. 1.

The theory of operation of the charging apparatus of FIG. 1 is best explained by first referring to FIG. 2. When corona discharge device 12 is rotated over the xerographic plate 13, it may be seen that a larger area is being charged by portions of device 12 toward its ends than toward its center. This naturally follows from the fact that the area of a circle increases as the square of its radius. Likewise it may be seen that the ends of device 12 move at a higher velocity relative to the surface being charged than portions of device 12 nearer to the center. To compensate for the relative velocity variation, it is necessary to increase the electrostatic charging current with an increase in distance from the center of the area being charged.

In accordance with the present invention, it is also desired that the resulting charge level on a surface being charged will increase in a linear fashion from the center to the circumference. However, considering the necessity of compensating for the relative velocity variation, as discussed above, as well as the desired variation in resulting charge level, the charging current along the discharge device must vary in a curvilinear fashion. Thus, the charging current must increase at a greater than linear rate toward the extremities of the charging device of these figures to deposit a charge having a linear variation.

One of the characteristics of the corotron is that the charging current that will flow to a plate or other electrode is dependent upon and varies directly with the width of the axial slit in the shield. Thus, the corotron of FIG. 3 has a tapered slit with a minimum width at the center for a low-charging current and a maximum width at the ends for a relatively high-charging current. In order that the charging current increases in accordance with a taper, the curvilinear taper of the axial slit in the corotron is also curvilinear as illustrated.

In a preferred embodiment, the apparatus of FIG. 1 is designed to charge a xerographic plate for exposure to an image from a plan position indicator presentation. In this preferred embodiment, the charging apparatus is designed so that the area to be charged is charged to a potential of about 100 volts from the center out to a one-inch radius. The charge to be effected in this preferred embodiment increases linearly along the radius to 1,000 volts at the circumference of the area to be charged and may for example extend over area equivalent to the usual scope face such as one having a seven inch diameter.

The charging range, indicated for a preferred embodiment above, is not limiting but depends largely upon the method by which the electrostatic image will be developed. For instance, when a cascade method of development is used, a voltage range extending from 100 to as high as 1,400 volts can produce acceptable results. On the other hand, if powder cloud or liquid development is utilized, extremely low usable charge levels produce developable images.

A multitude of factors have to be considered as causing variations in charging current from a corona discharge device to a surface to be charged. Among these are the diameter of the corona element, the distance between the corona discharge device and the surface to be charged, the voltage applied to the corona element, the voltage applied to control shields or grids near the corona element, the electrical characteristics of the member being charged, the field between the corona discharge device and the surface to be charged and the like. Some of these factors are adaptable for utilization in accordance with the inventive concepts as discussed below.

Figure 5:
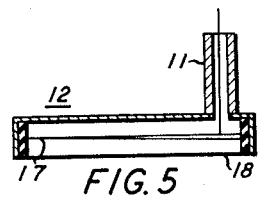
FIG. 5 is a diagrammatic view of the second embodiment of a corona discharge device for use in charging a circular area on a xerographic plate.

FIG. 5 illustrates an embodiment of a corona discharge device 12 in which the desired curvilinear taper of the charging current is attained by tapering the diameter of the corona element 17. Thus, the corona emitting element in the device of FIG. 5 is a conductive wire with a relatively large cross section at the center of rotation of the device and a relatively small cross section at the extremity of the device. As depicted in FIG. 5, charging device 12 has a length equal to the radius of the surface area to be charged. In operation, device 12 is rotated by a support member 11 positioned over a point central of the surface area to be charged. As is obvious, this shortened configuration is equally applicable to the embodiment discussed in connection with FIG. 3. Likewise, the device in FIG. 5 can be extended symmetrically as is the device discussed in relation to FIG. 3, but as should be apparent formation of the tapered discharge wire is simplified if a device as shown is employed. These same variations are equally applicable to the embodiments illustrated in FIGS. 6 through 9.

Figure 6:
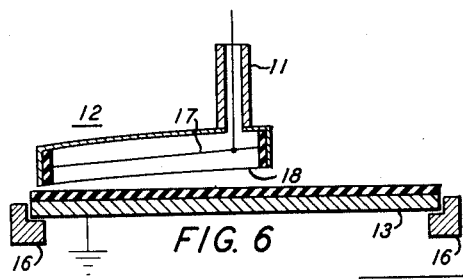
FIG. 6 is a diagrammatic view of a third embodiment of a corona discharge device for use in charging a circular area.

FIG. 6 illustrates an embodiment of corona discharge device 12 in which the curvilinear taper of charging current is attained by curving the device 12 in a manner as illustrated bringing it relatively closer to the surface to be charged at its extremity than at its center of rotation. Thus in FIG. 6, plate positioning supports 16 are situated to hold a plate to be charged so that its surface is closer to charging device 12 at the circumference of the area to be charged than at the center of the area to be charged.

Figure 7:
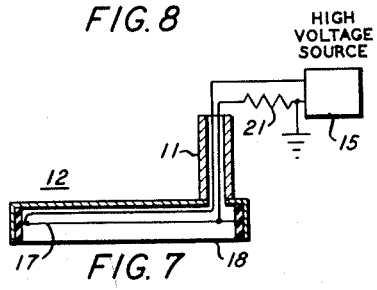
FIG. 7 is a fourth embodiment of a corona discharge device for use in charging a circular area.

FIG. 7 illustrates still another embodiment of corona discharge device 12 in which a corona element 17 is a high resistance filament. In this embodiment, one end of the corona element is connected to the high side of the high voltage supply 15. The other end of the corona element 17 is connected through a voltage dropping resistor 21 to a reference potential or the low side of high voltage supply 15. Thus, the end of the corona element at the extremity of device 12 is connected to the high side of supply 15 and receives a high potential permitting a high charging current. Along the corona element, in the direction of the rotational center of device 12, the potential is gradually dropped due to the high resistance of the element and the charging current is thus decreased. The voltage dropping resistor 21, connected to the inside end of the corona element, maintains the potential of the element at that end at the desired minimum level. In order to have a curvilinear tapered current characteristic, the high resistance corona element 21 has an increasing resistance characteristic along its length toward the inside end or rotational center.

Figure 8:
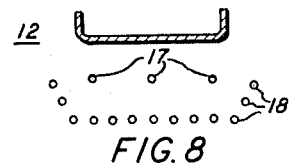
FIG. 8 is a second alternative cross-sectional view of the charging device illustrated in FIGS. 5 to 7.

FIG. 8 shows in cross section a corona discharge device which may alternatively be employed in the embodiments of FIGS. 5 to 7. Instead of the solid shield 18 used on a corotron as illustrated in FIG. 4, the charging current may be controlled by a grid or series of wires 18 as illustrated in FIG. 8. Corona discharge devices, constructed as illustrated in FIG. 8, are known in the art as scorotrons. Such a device is disclosed in greater detail in Walkup U.S. 2,777,957. The embodiments of the corona discharge device 12, disclosed in FIGS. 5 to 7, may comprise multiple corona elements 17, as in FIG. 8 as well as single elements. The shields 18, in these embodiments, may also be comprised of a series of longitudinal wires as illustrated in FIG. 8.

Figure 9:
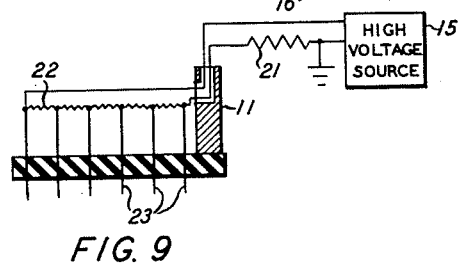
FIG. 9 is a fifth embodiment of a corona discharge device for use in charging a circular area.

FIG. 9 illustrates an additional embodiment of a corona discharge device comprising an array of vertical needles 23 supported on a rotational member. A voltage divider network 22, connected across high voltage supply 15, is connected to each of the needles at various taps. The taps on the voltage divider network are so selected that voltages applied to the different needles in the needle array will produce the desired variation in charging current along the array. As in the scorotron and as disclosed in the Walkup Patent 2,777,957, a screen or grid or wires may be positioned in front of the needle array for control purposes. A further variation of the embodiment, illustrated in FIG. 9, may be used to vary the charging current. In this further variation the needles 23, in the needle array, are spaced more widely near the rotational center of the device with closer spacing toward the end.

Various embodiments in corona discharge devices discussed in relation to the FIGS. 1 through 9 are also useful in charging a circular area in a uniform manner. To use these devices for this purpose, the charging characteristics would have to compensate only for the difference in relative velocity between the charging device and the surface being charged. In some of the commercial applications, in which a xerographic plate is charged by moving a corona discharge device over its surface, the transport mechanism for the corona discharge device is relatively complex. The rotational corona discharge device, in accordance with the present invention, may be caused to traverse the surface of a xerographic plate by a comparatively simple rotation means. By using these rotational corona discharge devices, it is thus possible to improve and simplify xerographic charging apparatus.

In FIG. 10, a fixed corona discharge grid is illustrated. This corona discharge grid 17 operates on the principle of two interwound corona discharge elements driven by pulsed direct current with the pulses on one element displaced 180° in time from the pulses on the other element. The pulsed direct current outputs are graphically illustrated beside the high voltage output terminals to first and second spiral corona elements 25 and 26 in FIG. 10. The principles of this type of corona discharge device are more fully disclosed in Ebert U.S. 2,932,742. For the purposes of the present invention, the corona discharge device illustrated in FIG. 10 comprises two conductive corona elements interwound in a spiral. In charging apparatus, in accordance with the present invention, the corona element windings will be separated to a greater extent toward the center of the spiral and will be more closely spaced approaching the circumference. It is noted that in this configuration, the variation in spacing will be in accordance with a linear taper so that the resulted charge variation on the surface being charged, will vary in a linear manner from the center to the circumference. Since there is no movement between the surface to be charged and the corona discharge elements during charging, relative velocities need not be considered.

Various combinations of the different features of the corona discharge devices discussed in relation to FIGS. 1 through 10 are possible. For example the corotron of FIG. 3, with its varied slit width, can also be positioned in an angular relationship to the surface being charged as discussed in reference to FIG. 6. Likewise the corotron, with a tapered corona element illustrated in FIG. 5, could use a high resistance tapered corona element and utilize voltage drop across the element as discussed in relation to FIG. 7. These and other combinations are within the scope of this invention.

The apparatus illustrated in FIG. 11 is another embodiment of charging apparatus for non-uniformly charging a xerographic plate along its surface. This apparatus comprises a corona discharge device 12 and transport means 27 comprising a reversible worm gear and support members 16 for supporting a member to be charged 13, as well as the transport means 27. In this configuration, the transport means 27 is supported so that it will bear an angular relationship to a member being charged as it moves relative thereto. As the charging device 12 is transported across the surface of a member to be charged, it is brought gradually closer to or farther away from said surface. Thus, one end of the surface being charged will receive a higher charging current than the opposite end. This apparatus is useful when it is desired to charge a fast charge decay photoconductive insulator by relative movement of the corona discharge means and then to expose the plate to an overall illuminating pattern without relative movement. Since the portion of the photoconductive insulating surface first charged will have decayed to a greater extent by the time of exposure than that portion of said surface last charged, it is advantageous to place a greater charge on that portion of the surface first charged. Thus a uniform charge will exist at the time of exposure.

In a xerographic plate non-uniformly charged, in accordance with the methods and apparatus described above, and exposed to a non-uniform illumination pattern, such a presentation from a PPI scope, conventional development and printing techniques can be used to produce good line copy. However, it is sometimes desirable to produce continuous tone reproductions. Continuous tone reproductions may be obtained with the use of a development electrode such as disclosed in Walkup U.S. 2,573,881. In operation, a development electrode should carry a potential approximately equivalent to the potential in the background areas at the time of development. This prevents development in such areas. Since in the present invention the surface is sensitized with a linear variation thereacross and exposure produces a uniform potential difference for development purposes across all areas, the background areas will not all have a uniform potential but will vary along a substantially linear amount following the trend of the variation in initial charging. It thus becomes necessary to use a development electrode with a potential gradient over its surface that will vary in the manner of the background potential on the xerographic plate at the time of development.

FIG. 12 shows a development electrode 29, which has a potential gradient over its surface varying from a minimum level at the center to a maximum level at the circumference. This development electrode 29 is comprised of a graphite disk 30 having a circular area comparable to the area to be developed. A power supply 31 is connected to a conductive rim 32 around the circumference of the graphite disk. The other side of power supply 31 is connected to reference potential and also through a voltage dropping device 33 to a conductive button 35 located at the center of the graphite disk. Current from the power supply will flow from the conductive button 35 through the graphite disk to the conductive rim 32. Voltage drop due to the resistive characteristics of the graphite disk will cause the potential appearing across the surface of the disk to vary. The voltage dropping device 33 will maintain the center of the graphite disk at a desired minimum potential. The potential gradient appearing across the surface of the graphite disk can be varied by controlling the cross-sectional thickness of the graphite disk 30 along its radius. The cross-sectional thickness along the radius of the disk must be such that the potential gradient across the surface of the disk will present the same potential as the background areas in an electrostatic latent image to be developed.

FIG. 13 illustrates a second embodiment of a development electrode 29 in accordance with the present invention. The embodiment of FIG. 13 comprises a series of concentric conductive rings 36 connected through a voltage dividing circuit 37 to a power supply 31. Each of the conductive rings is connected to a different tap of the voltage dividing circuit so that the outermost ring is connected to the highest voltage tap and the innermost ring to the lowest voltage tap. The voltage gradient across the concentric rings will then be similar to the voltage gradient obtained in the embodiment illustrated in FIG. 12.

In addition to non-uniform charging of a xerographic plate, compensation for non-uniform exposure can be obtained during development. The methods and means for exposure compensation in development are similar to and involve the same concepts as the methods and means described above in connection with non-uniform charging.

Electroscopic particles may be brought to a surface bearing an electrostatic latent image by a sheet uniformly coated with said particles as disclosed by Mayo in U.S. Patent 2,895,847. Such a particle donor sheet 61 is illustrated in FIG. 14. Electroscopic particles 62 are coated on donor sheet 61 in a non-uniform manner with the greater density toward the circumference of the surface. A preferred procedure for forming this non-uniform particle density is to charge the donor sheet 61 with one of the corona discharge devices illustrated and discussed in relation to FIGS. 1 to 10. Sheet 61 being made of an insulating material such as plastic will receive a non-uniform electrostatic charge. Powder cloud dusting of the sheet 61 with electroscopic particles 62 will then result in a non-uniform distribution as illustrated. Preferably loading of the donor is controlled so that during development substantially complete particle transfer takes place at edges and a less dense transfer occurs at the center.

A further method of non-uniform development involves the use of a development electrode such as illustrated in FIG. 13. Where a xerographic plate has been originally charged uniformly, a development electrode will generally carry a uniform potential approximating the latent image background potential. Variation from this theoretically optimum development potential will vary development density of the image considerably before causing objectionable background development. In a preferred embodiment, a non-uniform electrostatic latent image may be placed under development electrode rings 36 while a non-uniform potential is applied thereto. A powder cloud of electroscopic particles dispersed through the electrode rings 36 will then deposit with greater density in those areas where there is a greater potential difference between the rings 36 and the latent image.

Figure 15:
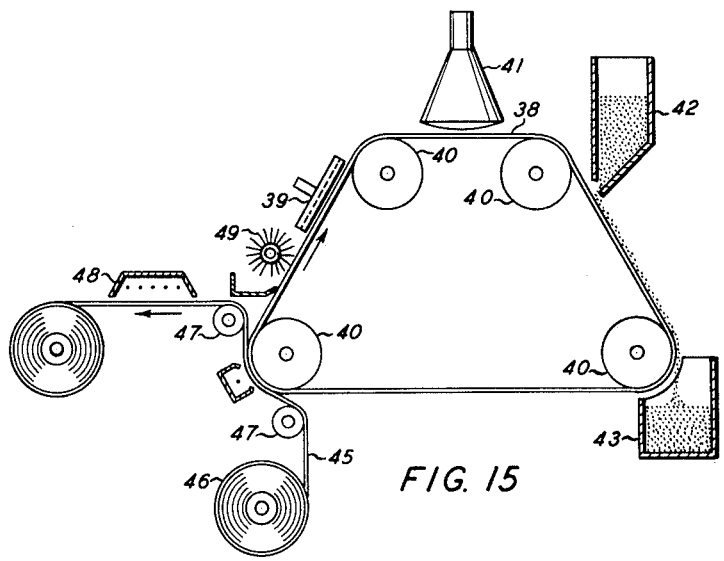
FIG. 15 is a diagrammatic illustration of xerographic apparatus for reproducing images having a circular area.

Xerographic apparatus, in accordance with the present invention, is illustrated in FIG. 15. This apparatus generally comprises a moving belt photoconductive insulating member 38 which will stop in the charging and in the exposing positions and will be in motion passing the developing, transfer and erasing positions. With the belt stationary, charging device 39, preferably similar to that disclosed in FIG. 3, is rotated over a circular area of the belt member 38. The charging device 39 imparts a charge over a circular area which has a minimum potential level at the center of the area and a relatively high potential at the circumference of the area. The belt member 38 is then advanced over transport rollers 40 to the exposure position. With the belt member again stationary, it is exposed to a selective illumination pattern from a PPI 41. After the desired exposure time, the belt 38 is advanced continuously past developer feed 42 from which developer particles are cascaded across the electrostatic latent image on the belt member 38. As the belt member moves around the following transport roller, excess developing particles are picked up by receptacle 43. After developing, the belt member 38 continues on and is brought adjacent to the printing paper 45. The printing paper is rolled synchronously against the belt member, transferring the image to the paper. The printing paper is supplied from a supply reel 46 over sheet rollers 47 and, after image transfer, to a fixing station 48 where the image is fixed to the paper. The moving belt 38 then continues on to an erasing device 49 which removes residual developing particles and latent image from the belt before it returns to the charging position.

Successive copies of PPI presentations, having improved uniformity in image definition and contrast, are produced by this apparatus.

Figure 16:
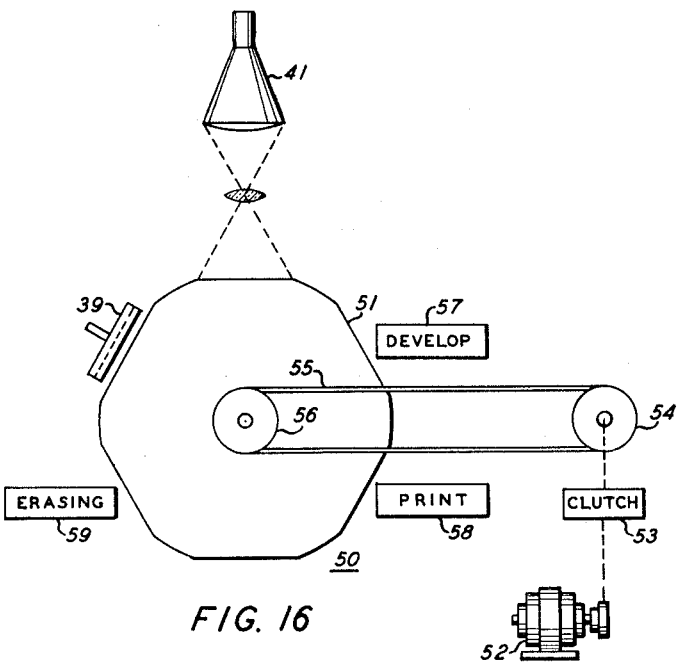
FIG. 16 is a diagrammatic illustration of a second embodiment of xerographic apparatus for reproducing images having a circular area.

FIG. 16 illustrates xerographic apparatus 50, for reproducing a PPI presentation, comprising a hexagonal xerographic plate drum 51 which is rotated through the various process stations by an intermittent drive apparatus including a drive motor 52 and a solenoid operated clutch 53. The clutch 53, driven by drive motor 52, engages and turns pulley 54. With drive motor 52 turning continuously, pulley 54 turns and stops alternately as determined by clutch 53. Pulley 54 is attached to drive belt which, in turn, drives drum pulley 56. Drum pulley 56 rotates the hexagonal xerographic drum 51 in an intermittent manner as clutch 53 engages and disengages. In each step of rotation of drum 51, one of the six surfaces is charged by a corona discharge device 39 which is preferably the embodiment disclosed in relation to FIG. 6. A second of the six surfaces is exposed to a presentation from a PPI 41. A third of the six surfaces is developed by conventional developing apparatus 57. A fourth of the six surfaces is printed by conventional printing means 58. A fifth of the six surfaces is idle and the sixth surface is erased and cleaned of remanent developer and residual image by conventional erasing means 59. As should be apparent elements of the various stations around the plate are moved out of the path of the plate when it is indexed to a new station.

This invention is not to be considered as limited to reproduction of PPI presentations. The methods, means and apparatus are equally applicable to reproduction of other characteristically non-uniform patterns of illumination.

While the present invention as to its objectives and advantages has been described herein as carried out in specific embodiments thereof, it is not desired to be limited thereby, but it is intended to cover the invention broadly within the spirit and scope of the appended claims.

What is claimed is:

1. A charging apparatus to sensitize a xerographic plate adapted to compensate for predictable non-uniformity in an original to be reproduced, said apparatus comprising a discharge electrode, means to generate ions at said discharge electrode, a plate support to position and dispose a plate to be charged adjacent to said discharge electrode, means to cause relative motion between said plate support and said discharge electrode, means to apply an ion moving field between said discharge electrode and said plate support to cause ions discharged from said discharge electrode to deposit on a plate on said support, and control means associated with said discharge electrode to cause ion flow between said electrode and a plate on said support to increase in curvilinear fashion with successive increments of distance from an inner to an outer end of said electrode.

2. Charging apparatus according to claim 1 in which said means to cause relative motion comprises means to rotate said discharge electrode in a plane parallel with the surface portion of a xerographic plate to charge a circular area of the plate surface.

3. Apparatus according to claim 2 wherein said discharge electrode has a length substantially equal to the radius of said substantially circular surface area.

4. Apparatus according to claim 1 in which said control means includes an element of said discharge electrode having a curvilinearly tapered axial configuration.

5. Apparatus for charging a rectangular xerographic plate in a non-uniform manner to compensate for variation in charge decay caused by a difference in time delay between charging and exposing one portion of said plate as compared to another portion of said plate, comprising corona discharge means, plate support means, and means to cause said corona discharge means to traverse a plate positioned on said support means along a plane bearing an angular relationship thereto.

6. A charging apparatus adapted to sensitized a circular surface portion of a xerographic plate so as to compensate for characteristic non-uniformity in an original to be reproduced, said apparatus comprising corona discharge means, and plate support means to position and support a plate to be charged adjacent to said corona discharge means, said corona discharge means including means to cause the amplitude of charging current to vary in a curvilinear manner along its length so that said current will be at a minimum near the center of a circular surface area to be charged and at a maximum at the circumference of a circular surface area to be charged.

7. Apparatus according to claim 6 including means to cause relative rotation between said plate support and said discharge means, and in which said means to cause the amplitude of charging current to vary is a corona element having a diameter tapering in a curvilinear manner that is inversely related to the amplitude of charging current to be produced.

8. Apparatus according to claim 6 including means to cause relative rotation between said plate support and said discharge means, and in which said means to cause the amplitude of charging current to vary is a charging current control means shaped and disposed in such a way that the distance between said control means and a plate positioned on said plate support will vary in a curvilinear manner inversely related to the amplitude of charging current to be produced.

9. Apparatus according to claim 6 including means to cause relative rotation between said plate support and said discharge means, and in which said means to cause the amplitude of charging current to vary comprises a high resistance corona emission element, a direct current potential source, and circuit means for applying a portion of the potential from said potential source across said corona emission element so that the applied potential will be dropped along the length of said corona emission element providing a potential gradient that is directly related to the amplitude of the charging current to be produced.

10. Apparatus for depositing electrostatic charge on a circular surface area of an insulating layer comprising a corona discharge electrode, a plate support means for positioning a plate member including said insulating layer adjacent to said corona discharge means, and a means for rotating said corona discharge means in a circular path adjacent to a plate on said support means to charge a circular area.

11. A charging apparatus to form a non-uniform electrostatic charge on a substantially circular surface area of a chargeable member, comprising a high voltage direct current source, first and second interwound concentric spiral corona emission elements connected to said direct current source, and support means for supporting a chargeable member in a position adjacent to the spiral plane of said corona emission elements, said direct current source delivering first direct current pulses to said first of said corona emission elements and said direct current source delivering second direct current pulses displaced 180° in time from said first direct current pulses to said second of said corona emission elements, and said concentric spiral turns of said corona emission element spaced by successively decreasing increments approaching the perimeter of the spiral so that a circular surface area to be charged will receive a linearly increasing potential level of charge from its center to its circumference.

12. A xerographic charging apparatus for depositing a linear taper charge on a xerographic plate comprising corona discharge means, plate support means to position and dispose said xerographic plate adjacent to said corona discharge means, and means to move said discharge means relative to said plate support means, said corona discharge means comprising a corona discharge element disposed longitudinally inside an elongated shield member, said shield member having a lateral tapered opening disposed in line with the corona discharge means so that a surface to be charged will receive a higher potential charge where adjacent to the wider part of the tapered opening and a lower potential charge where adjacent to the narrower part of the tapered opening.

13. Corona charging apparatus comprising: a corona discharge device, a support arranged to position a plate comprising an insulating layer to receive charge from said device, means to apply an ion-moving field between said device and said support to cause ions discharged from said device to deposit on a plate positioned by said support and means to monotonically vary the quantity of ions deposited per unit area as a function of distance on said plate from a geometric reference to a peripheral edge.

References Cited in the file of this patent

UNITED STATES PATENTS

| | | |
|---|---|---|
| 2,752,833 | Jacob | July 3, 1956 |
| 2,758,525 | Moncrieff-Yeates | Aug. 14, 1956 |
| 2,777,745 | McNaney | Jan. 15, 1957 |
| 2,777,957 | Walkup | Jan. 15, 1957 |
| 2,778,946 | Mayo | Jan. 22, 1957 |
| 2,781,704 | Mayo et al. | Feb. 19, 1957 |
| 2,784,109 | Walkup | Mar. 5, 1957 |
| 2,817,598 | Hayford | Dec. 24, 1957 |
| 2,836,725 | Vyverberg | May 25, 1958 |
| 2,856,533 | Rosenthal | Oct. 14, 1958 |
| 2,868,989 | Haacke | Jan. 13, 1959 |
| 2,890,922 | Huebner | June 16, 1959 |
| 2,914,403 | Sugarman | Nov. 24, 1959 |